United States Patent [19]
Hansen

[11] Patent Number: 5,968,165
[45] Date of Patent: Oct. 19, 1999

[54] SYSTEM AND METHOD FOR MINIMIZING THE SIZE OF OPERANDS

[75] Inventor: Craig C. Hansen, Los Altos, Calif.

[73] Assignee: Microunity Systems Engineering, Inc., Sunnyvale, Calif.

[21] Appl. No.: 08/854,128

[22] Filed: May 8, 1997

Related U.S. Application Data

[60] Provisional application No. 60/017,429, May 8, 1996.

[51] Int. Cl.$^6$ .............................. G06F 7/00; G06F 9/302
[52] U.S. Cl. ......................... 712/210; 712/898; 708/601
[58] Field of Search .................................... 712/204, 207, 712/208, 210, 213, 214, 898; 708/520, 601

[56] References Cited

U.S. PATENT DOCUMENTS

| | | | |
|---|---|---|---|
| 4,258,419 | 3/1981 | Blahut et al. | 395/386 |
| 4,424,563 | 1/1984 | Lynch | 395/588 |
| 5,053,953 | 10/1991 | Patel | 395/898 |
| 5,450,605 | 9/1995 | Grochowski et al. | 395/800.23 |
| 5,689,672 | 11/1997 | Witt et al. | 395/389 |

*Primary Examiner*—Viet D. Vu
*Attorney, Agent, or Firm*—McDermott, Will & Emery

[57] ABSTRACT

A dynamic word size processing system which determines for each instruction the number of cycles required by a data path to compute the result. Values in a register file are augmented with additional information which permits a determination of the number of cycles required based on the values in the register file which are referenced by each instruction. A control path combines the information for each register file operand, and computes a value for the additional information to be stored with the result of the instruction.

24 Claims, 4 Drawing Sheets

SYSTEM AND METHOD FOR MINIMIZING THE SIZE OF OPERANDS

RELATED APPLICATIONS

This is a continuation of Provisional Application Ser. No. 60/017,429, filed on May 8, 1996, entitled DYNAMIC WORD SIZE PROCESSING SYSTEM.

FIELD OF THE INVENTION

The present invention relates to the field of control and data paths of processors in computer systems.

BACKGROUND OF THE INVENTION

In order to reduce development costs of hardware and software of computer systems, it is highly desirable to specify a common architecture design among a series of designs. The common architecture specifies a user instruction set and other system facilities that several processor designs implement compatibly. The use of a common architecture allows the reuse of hardware and software designs across a number of distinct architecture designs that vary in performance, cost, memory capacity and other design parameters.

A scalable architecture is a series of hardware designs which allows for variance of the design parameters while simultaneously maintaining a common architecture. One of the design parameters which limits the degree to which an architecture is scalable is the word size of the instruction set.

The word size of the instruction set is the number of bits of width of operands in the operations specified by the instruction set. Most processors utilize a word size that is a power of two, such as 16, 32, 64, or even 128 bits. The word size of some instructions may be different than others. For example, a processor may have some instructions with a 16 bit word size and others that have a 32 bit word size, where the word size is decoded from the instruction code, such as the Motorola 68000.

The data path size is the number of bits of width of operands which are taken in parallel in a data path to perform the operations specified by the instruction set.

The data path size is generally equal to the maximum word size in many implementations. When the word size varies, such an implementation leaves a portion of the data path unused or useless computing a value which is not stored. However some designs, such as the Motorola 68000, which has a 32-bit word size, implement the processor with a 16-bit data path. Such a design requires multiple execution cycles to perform 32-bit word size instructions.

When the data path size is equal to the maximum word size, performance is optimized, but instructions which use less than the maximum word size are not performed with the best possible efficiency, because the circuits which are not employed in the computation consume power and circuit area. When the data path size is less than the maximum word size, less circuit area is used, and the performance and power is directly proportional to the word size. Consequently, the latter design has lower price and power, but lower performance.

When small two's complement values appear as operands or results in a processor with a wide word size, many of the high order bits of these operands will be identical to the sign bit. However, if successive values of operands or results change the sign of the value, many bits change value. These changing values can result in substantial use of power in CMOS or other implementation technologies that consume power primarily on signal transitions.

Thus, there exists a need for a method and apparatus for dynamically varying the word size of the data paths and various control paths in accordance with the size of the operands so as to eliminate the foregoing problems and increase overall efficiency and performance.

SUMMARY OF THE INVENTION

The present invention relates to a processing method and an architectural design in which the word size of control paths and data paths vary depending upon the values of the operands of the instruction in a manner that increases the overall efficiency and flexibility of the computer system.

More specifically, the present invention comprises a control path and data path that dynamically determines the minimum word size which is required to execute each instruction depending upon the values of the operands. The operands are contained in subfields of the instruction and within a register file within the data path. The values of the operands in the register file are stored in a redundant form, in that each value itself is contained in the register file, along with additional information. The additional information is employed to determine a minimum word size in which the value can be represented without loss of information.

One exemplary embodiment of the invention, the dynamic word size processing system comprises means for partitioning an operand into a plurality of subfields, with one of the subfields being the most-significant subfield; means for assigning a tag to each of the plurality of subfields, where the tag is operative for indicating whether a given subfield of the operand is the most-significant subfield; and means for processing the plurality of subfields in accordance with an instruction associated with the operand until the most significant subfield is processed.

As described in detail below, the method and apparatus of the present invention provides important advantages over the prior art. Most importantly, the present invention optimizes both system performance and overall power efficiency, thereby overcoming significant disadvantages suffered by prior art devices as detailed above.

Additional advantages of the present invention will become apparent to those skilled in the art from the following detailed description of exemplary embodiments, which exemplify the best mode of carrying out the invention.

The invention itself, together with further objects and advantages, can be better understood by reference to the following detailed description and the accompanying drawings.

DETAILED DESCRIPTION

A dynamic word size processing system in accordance with the present invention is described below. In the following description, numerous specific details are set forth, such as word size, data path size, and instruction formats etc., in order to provide a thorough understanding of the present invention. It will be obvious, however, to one skilled in the art that these specific details need not be employed exactly as set forth herein to practice the present invention. In other instances, well known processor control path and data path structures have not been described in detail in order to avoid unnecessarily obscuring the present invention.

Figure 1:
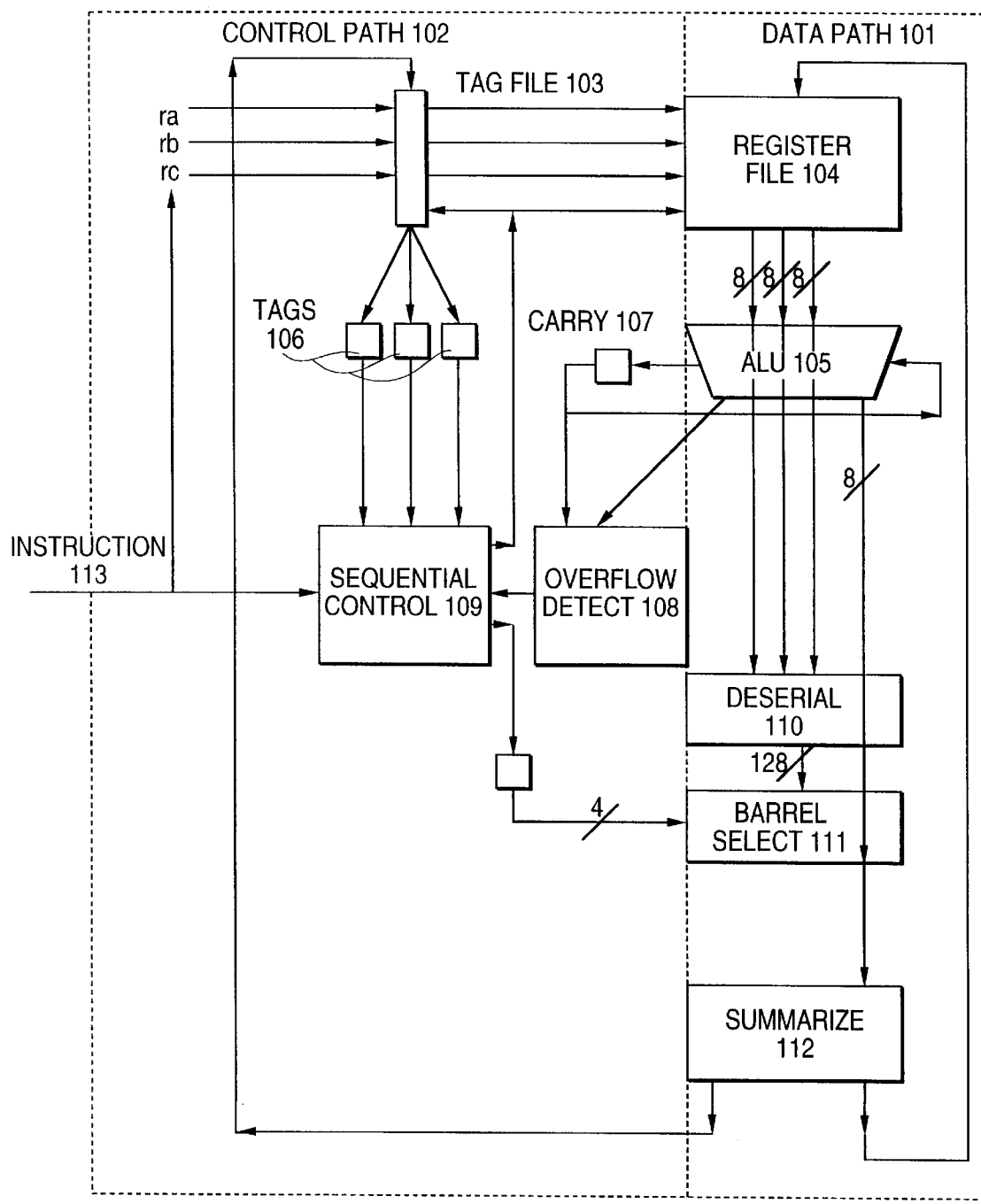
FIG. 1 illustrates an exemplary embodiment of the block diagram of the dynamic word size processing system of the present invention.

FIG. 1 illustrates a block diagram of an exemplary embodiment of the dynamic word size processing system of the present invention. As shown, the system can be divided into two main subsystems, one of which forms a data path 101 and one which forms a control path 102. In the exemplary embodiment, a 128-bit word size is specified in the instruction set, and an 8-bit data path 101 is employed to implement the instruction set. For each 8-bits in the register file 104, a 1-bit tag file 103 contains additional information, which is read into 3 1-bit storage elements: tags 106. This additional information is set (equal to "1") if the 8-bit subfield is the most-significant subfield of the register file value, and is cleared (equal to "0") if the 8-bit subfield is a less-significant subfield of the register file value. All other subfields contain values which are ignored, and the sequential controller 109 forces the register file 104 to substitute the most-significant bit of the previous subfield to appear in their place, if an attempt is made to read the subfield. Sequential controller 109 combines information from the instruction 113 with the tags 106 and causes values to be read out of the register file 104 and tag file 103 starting with the least-significant subfields, and then continuing until the most-significant subfield has been read for all register operands.

As stated, the sequential controller 109 receives the instruction 113 and generates control information to the register file 104 and tag file 103 and other elements of the data path (ALU 105, deserial 110, barrel select 111 and summarize 112) to operate the data path in a sequential, byte-at-a-time, manner. In turn, the sequential controller 109 receives information from tags 106 and overflow detect 108 to determine when to terminate the execution of the instruction 113 and cause another instruction to be fetched. The implementation of the sequential controller 109 is logic and storage (e.g., flip-flops) forming a sequential logic circuit.

Register file 104, when directed by sequential controller 109 ignore the values stored in the register file and substitutes the most-significant bit of the previous subfield, sequentially producing a value which is the two's complement sign-extended value of the less-significant subfields. As such, both positive and negative values can be compressed to a minimum number of subfields.

As is clear from the foregoing description, in the exemplary embodiment the additional information is a single bit of tag information, which indicates the most-significant subfield. There is one bit per subfield. In an architectural register of 128 bits built up of several subfields, for example 16 subfields, there are a total of 16 tag bits per 128 bits. It should be noted that the most-significant of the 16 tag bits need not be physically stored. A hard-wired "1" value can replace the most-significant bit, as it will only be read when the fifteen less-significant bits are all "0".

Simple arithmetic operations, including add, subtract, and, or, exor, exnor, andnot, omot are performed by 8-bit ALU 105, generating a carry bit 107, which is used to perform greater than 8-bit add and subtract operations. An overflow detect 108 determines when an add or subtract operation produces a result which is larger in required word size than the operand word size.

Shift operations require that serially-presented operands be expanded out to as much as the full word size of the instruction set, 128-bits, by the deserial block 110. This permits the barrel select block 111 to select any group of 8 bits from the 128-bit operand. The summarize block 112 removes subfields which are marked most-significant as determined by sequential controller 109.

Figure 4:
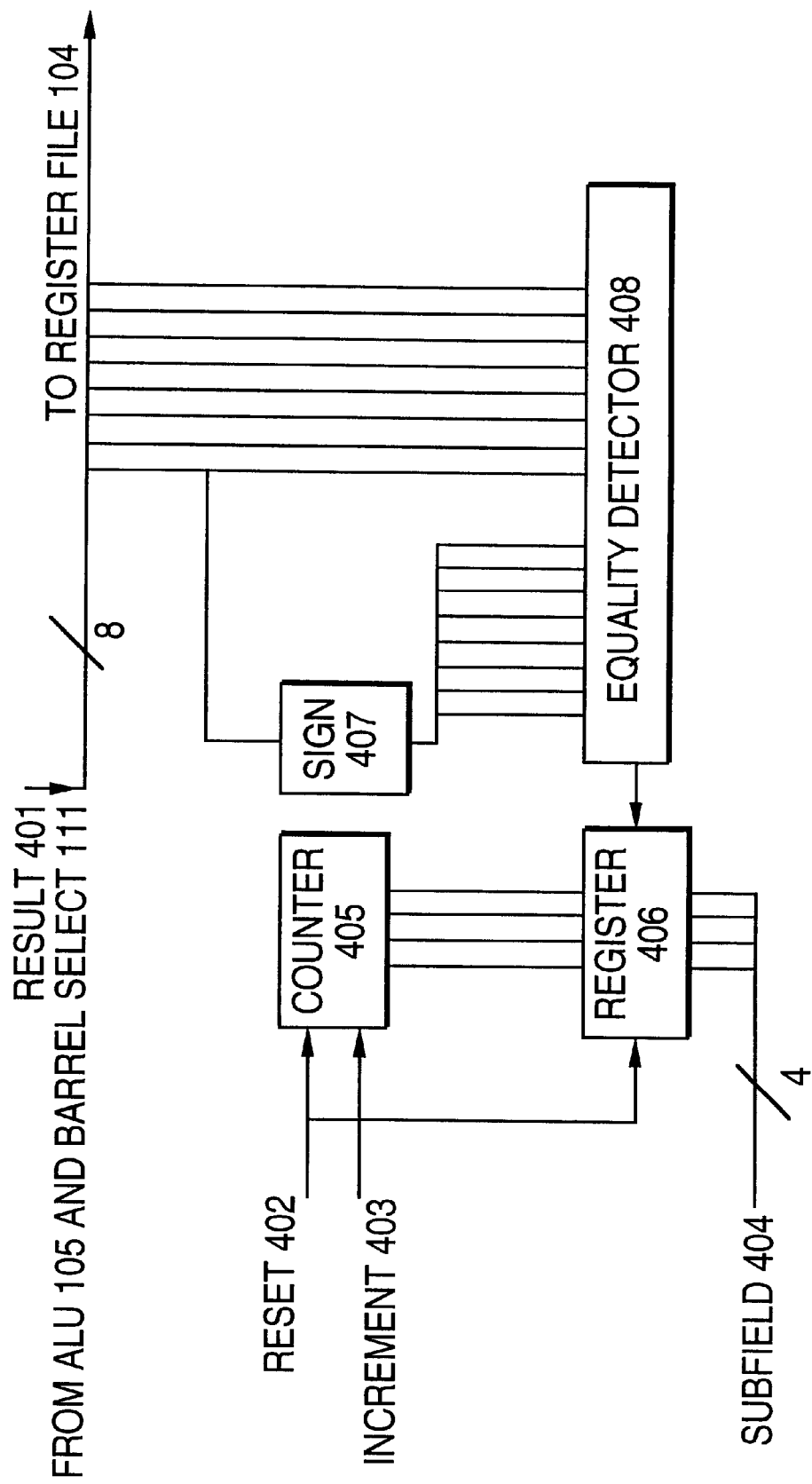
FIG. 4 illustrates an exemplary embodiment of the summarize block 112 shown in FIG. 1.

Referring to FIG. 4, the summarize block 112 comprises a logic circuit that detects subfields whose bits are all equal to the value of the most-significant bit of the previous (less-significant) subfield. Such subfields are not significant if no further significant subfields are scanned. As such, the summarize block 112 retains the location of the most-significant subfield. At the termination of the processing of an instruction, the location of the most-significant subfield is sent to the tag file 103, where a "1" bit is written into the tag file 103 at that location. As a result, subfields which are not significant to the result are detected and marked as such in the tag file, so that subsequent operations need not read these subfields. The data path 101 input to summarize block 112 is the result of data path calculations performed by ALU 105 or barrel select 111. The data path 101 output of the summarize block 112 is the same result (the data path value shown in FIG. 1 passes unchanged through the summarize block).

An exemplary implementation of the summarize block 112 comprises a 4-bit counter 405 which is initialized to zero at the beginning of the instruction execution (reset 402) and incremented thereafter (increment 403), a 4-bit register 406 which is also zeroed at the beginning of instruction execution and loaded from the counter 405 when a significant subfield is detected by an equality detector 408, a 1-bit register (sign 407) which retains the most-significant bit of the previous subfield, and equality detector 408 which compares each bit of sign 407 with the current subfield and enables the loading of the 4-bit register 406 when the values are unequal. The 4-bit register 406 is the location which is sent to the tag file 103. In tag file 103, a "1" bit is written into the specified location of the tag for the register entry which is the target of the instruction on the final cycle of the operation.

In accordance with the present invention, the ratio of the value size, which is the minimum word size in which the value can be represented without loss of information, to the data path 101 size (referred to as the value ratio) determines the number of clock cycles over which the data path 101 must operate to fetch each operand from the register file 104.

The control path 102 combines the value sizes of the operands of the instruction together to determine the minimum word size in which the result may be computed without loss of information (referred to as the execution size).

The ratio of the execution size to the data path 101 size (referred to as the execution ratio) determines the number of clock cycles over which the data path 101 must operate to perform the computation.

The result of the computation is further processed by the summarize block 112, which scans the result itself, as controlled by the control path 102. The execution ratio and the result are utilized to determine the minimum word size in which the result may be represented without loss of information (referred to as the result size).

The ratio of the result size to the data path 101 size (referred to as the result ratio) determines the number of clock cycles over which the data path 101 must operate to store the result into the register file 104.

As the value ratio, execution ratio, and result ratio determine the number of clock cycles required to perform the instruction, the value size, execution size, and result size are all approximated to the next largest multiple of the data path 101 size.

In the exemplary embodiment of the present invention, the value ratio is stored implicitly by storing a single bit associated with each data path size subfield of the operand in the register file 104. The single bit is a "1" for the most-significant subfield of the operand, and is a "0" for each of the less-significant subfields.

In another embodiment of the present invention, the value ratio is stored directly as the additional information in the register file 104.

Figure 2:
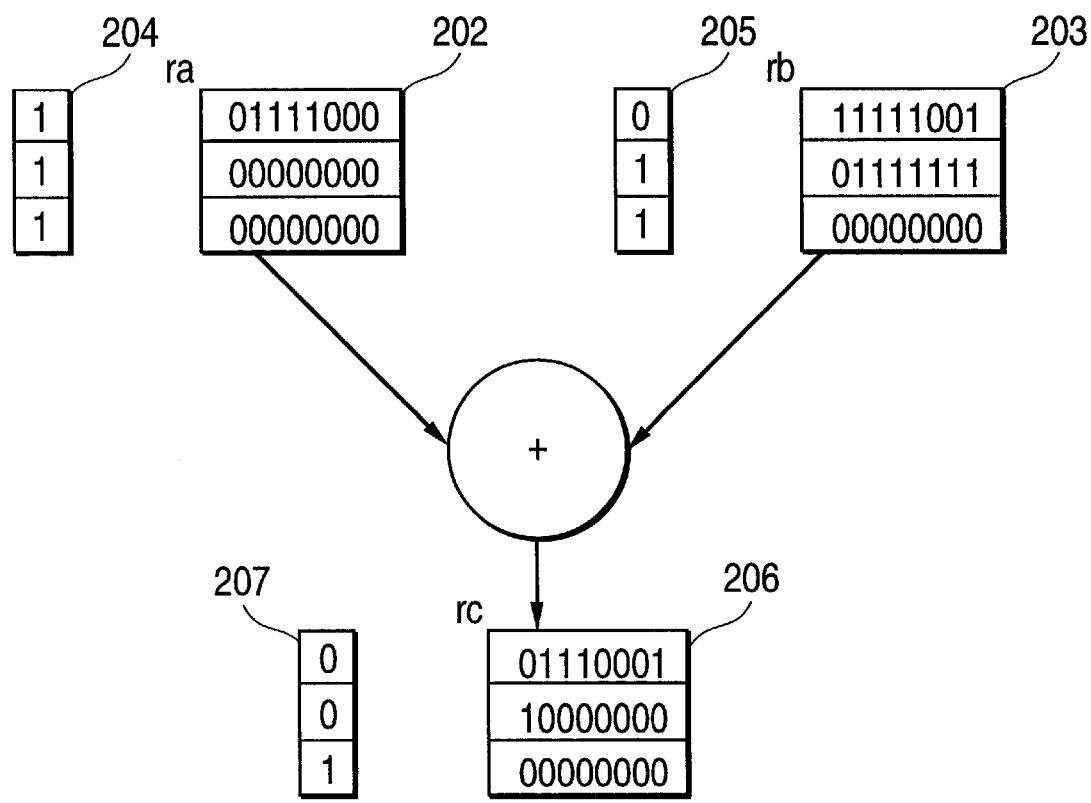
FIG. 2 illustrates the execution of a group-add-quadlet instruction using the components shown in FIG. 1.

FIG. 2 illustrates a group-add-quadlets instruction performed in accordance with the present invention. As shown in FIG. 2, the group-add-quadlets instruction 201 fetches two 128-bit register file operands specified by ra and rb, and adds together corresponding 32-bit values, placing the 128-bit result in the register file 104 as specified by rc. In this example, the values computed by the control path 102 are indicated for the values shown. The ra value 202 is 120 (01111000$_2$), and the rb value 203 is 32762 (01111111 11111001$_2$). On the first cycle, the ra subfield of (01111000) and the rb subfield of (11111001) is read from the register file 104, along with the tag 204 for ra of (1) and the tag 205 for rb of (0). The tag 205 indicates that rb contains more significant bits than have been read so far, while all the significant bits of ra have now been read, so one or more additional cycles are required to read the operands. The subfield of (01110001) with a carry of (1) is computed for the result 206.

On the second cycle, the ra value 202 is ignored and forced to zero (00000000), and the rb subfield of (01111111) is read from the register file 104 along with additional information including the tag 204 for ra (ignored) and the tag 205 for rb of (1). The tag 205 indicates that all the significant bits of rb have been read, so no more cycles are required to read the operands. The result of (10000000) is computed, and a detected overflow causes the result to be extended to three bytes (00000000 10000000 01110001). The result, 32882, is stored as three subfields 206 and tags 207, starting from the least-significant byte: (01110001+0), (10000000+ 0), and (00000000+1).

Overflow detect block 108 determines an overflow using "two's complement signed overflow" as the criterion. A two's complement signed overflow occurs on addition when the carry out of the most-significant bit is not equal to the carry into the most-significant bit. In this case, the carry out is zero, but the carry into the most-significant bit of the result is a one, which represents an overflow.

Figure 3:
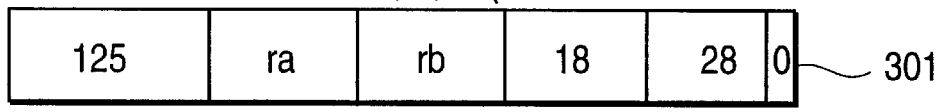
FIG. 3 illustrates the execution of a group-shift-right-hexlet instruction using the components shown in FIG. 1.
Figure 3:
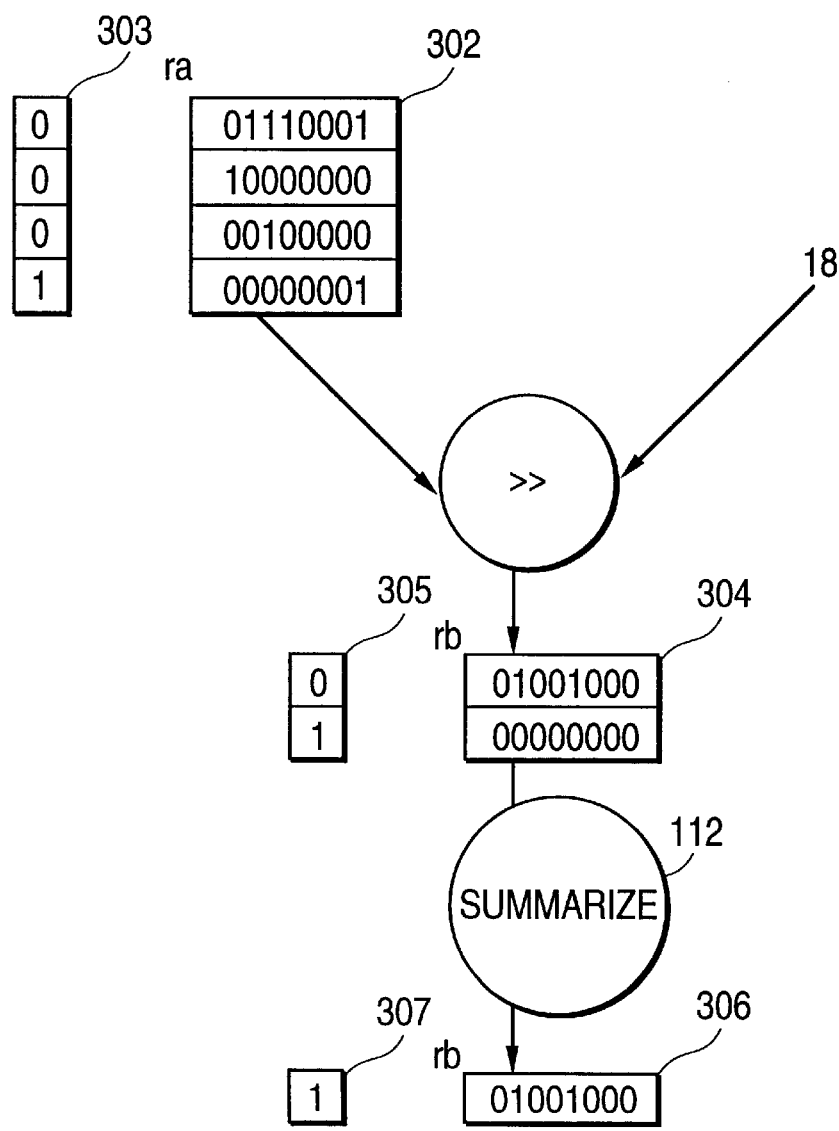

FIG. 3 illustrates a group-shift-right-immediate-hexlets instruction performed in accordance with the present invention. As shown in FIG. 3, the group-shift-right-immediate-hexlets instruction 301, fetches a 128-bit register file operand specified by ra and the associated tags 303 and shifts the 128-bit value to the right by the number of bits specified in the instruction, placing the 128-bit result in the register file 104 as specified by rc. In this example, the values computed by the control path 102 are indicated for the values shown. The ra value 302 is 8907250 (00000001 00100000 10000000 01110001$_2$), and the shift amount is 18. The sequential controller 109 begins fetching the ra operand, starting at the least-significant subfield, then waits until the fourth subfield has been placed into the deserial block 110. Then, the sequential controller 109 signals the barrel select 111 to begin selecting bits, one subfield at a time, starting with a subfield beginning at bit 18. The sequential controller 109 requires two subfields 304 and associated tags 305 to be generated (00000000 01001000), as it does not examine the contents of the register file 104, from which it could be determined that the most-significant subfield contains no significant bits. The summarize block 112 examines the result, turning on the tag field 307 for the first subfield 306, and truncating the result to a single subfield. It might appear at first that two cycles can be saved by starting the read of operand ra with the third subfield, but an invalid result would be computed if the value had significant bits only in the first or second subfield.

In an alternative embodiment to the exemplary embodiment disclosed above, the system of present invention stores the value ratio information as a single binary value for each register file value. For an implementation with a 128-bit word size and an 8-bit data path size, a 4-bit value representing the range of 1–16 subfields is used as the tag. The operation of the components of FIG. 1 would be altered in that the value read from the tag file 103 is held in the tag storage 106 for the duration of execution of the instruction. This embodiment permits the group-shift-right-immediate-hexlet example above to be performed with the register file fetch starting at the third subfield, as the value ratio is known directly by reading the tag.

Another alternative to the exemplary embodiment of the present invention is a superscalar processor, in which additional register file ports are provided so that multiple functional units may execute instructions at the same time. In such a design, the data path width of each functional unit may be different, to balance the computation power of the functional units.

Another alternative embodiment utilizes unsigned overflow and check for most-significant zero subfields only, as opposed to signed overflow and checking for either most-significant zero or most-significant ones. Such an embodiment results in a simpler design in that the sign bit 407 block can be eliminated and the equality detector 408 can be replaced with a zero detector.

Another alternative embodiment utilizes a multi-bit binary-number tag to determine which portion of a wide data path to enable. The disabled portion of the data path may utilize clock suppression (in which the clock is disabled to prevent new values from propagating through) or may switch off the power supplies. In either case, operating power is reduced when performing operations on values which do not require the use of the full data path.

As stated the method and apparatus of the present invention provides important advantages over the prior art. Most importantly, the use of the present invention provides a reduction in power necessary for computations involving large word sizes and small values. As described earlier, two's complement representation of small values in a large word size have many high-order bits which are identical to the sign bit. The present invention compresses most of the high-order bits away by selecting a dynamic word size no more than one data path width greater than that required to hold the value, thus minimizing power.

Although the elements of the present invention have been described in conjunction with an exemplary embodiment, it is appreciated that the invention may be implemented in a variety of other ways. Consequently, it is to be understood that the particular embodiment shown and described by way of illustration are in no way intended to be considered limiting. Reference to the details of these embodiments is not intended to limit the scope of the claims which themselves recite only those features regarded as essential to the invention.

I claim:

1. A dynamic word size processing system comprising:
    means for partitioning an operand associated with an instruction into a plurality of subfields, said plurality of subfields having a single most-significant subfield;
    means for assigning a tag to each of said plurality of subfields, said tag operative for indicating whether a given subfield of said operand is the most-significant subfield; and
    means for processing said plurality of subfields in accordance with said instruction associated with said operand until said most-significant subfield is processed, producing a result partitioned into a plurality of subfields,
    said system determining the minimum number of subfields of the operand necessary to represent the operand without loss of information operand based on the contents of the operand.

2. The dynamic word size processing system of claim 1, wherein each of said plurality of subfields has a width comprising the same number of bits, and which is equal to the width of a data path utilized to implement an instruction set.

3. The dynamic word size processing system of claim 1, wherein said tag comprises a single bit.

4. The dynamic word size processing system of claim 1, further comprising means for assigning a second tag to said result obtained by performing said instruction, said second tag operative for identifying the minimum number of subfields of said result necessary to represent said result without loss of information.

5. The dynamic word size processing system of claim 1, wherein said instruction comprises a plurality of operands, each of which is partitioned into a plurality of subfields, with each subfield having an associated tag indicating whether a given subfield of a given operand is the most-significant subfield of said given operand.

6. The dynamic word size processing system of claim 1, further comprising a summarize block operative for sequentially comparing said subfields of said result so as to identify a most-significant subfield of said result, and for storing the location of said most-significant subfield in a tag file.

7. A dynamic word size processing system comprising:
    means for partitioning an operand associated with an instruction into a plurality of subfields; and
    means for assigning a tag to said operand, said tag operative for identifying the minimum number of subfields of the operand necessary to represent the operand without loss of information,
    said system determining the minimum number of subfields of the operand necessary to represent the operand without loss of information operand based on the contents of the operand.

8. The dynamic word size processing system of claim 7, wherein said tag comprises a multiple bit value.

9. The dynamic word size processing system of claim 7, further comprising means for enabling only a portion of a data path, said portion of said data path corresponding to said minimum number of subfields necessary to represent the operand as defined by said tag.

10. The dynamic word size processing system of claim 7, further comprising means for assigning a second tag to a result obtained by performing said instruction, said second tag operative for identifying the minimum number of subfields of said result necessary to represent said result of said instruction without loss of information.

11. The dynamic word size processing system of claim 10, wherein said second tag comprises a single bit.

12. The dynamic word size processing system of claim 10, wherein said second tag comprises a multiple bit value.

13. A method for determining a minimum word size required to execute an instruction having at least one operand, said method comprising the steps of:
    partitioning said operand into a plurality of subfields, said plurality of subfields having a single most-significant subfield;
    assigning a tag to each of said plurality of subfields, said tag operative for indicating whether a given subfield of said operand is the most-significant subfield; and
    processing said plurality of subfields in accordance with said instruction until said most-significant subfield is processed, producing a result partitioned into a plurality of subfields,
    said minimum number of subfields of the operand necessary to represent the operand without loss of information being determined based on the contents of the operand.

14. A method for determining a minimum word size required to execute an instruction having at least one operand according to claim 13, wherein each of said plurality of subfields has a width comprising the same number of bits, and which is equal to the width of a data path utilized to implement an instruction set.

15. A method for determining a minimum word size required to execute an instruction having at least one operand according to claim 13, wherein said tag comprises a single bit.

16. A method for determining a minimum word size required to execute an instruction having at least one operand according to claim 13, further comprising the step of assigning a second tag to said result obtained by performing said instruction, said second tag operative for identifying the minimum number of subfields of said result necessary to represent said result without loss of information.

17. A method for determining a minimum word size required to execute an instruction having at least one operand according to claim 13, wherein said instruction comprises a plurality of operands, each of which is partitioned into a plurality of subfields, with each subfield having an associated tag indicating whether a given subfield of a given operand is the most-significant subfield of said given operand.

18. A method for determining a minimum word size required to execute an instruction having at least one operand according to claim 13, wherein said subfields of said result are sequentially compared to one another so as to identify said most-significant subfield, and the location of said most-significant subfield is stored in a tag file.

19. A method for determining a minimum word size required to execute an instruction having at least one operand, said method comprising the steps of:
    partitioning said operand into a plurality of subfields; and
    assigning a tag to said operand, said tag operative for identifying the minimum number of subfields of the operand necessary to represent the operand without loss of information,
    said minimum number of subfields of the operand necessary to represent the operand determined based on the contents of the operand.

20. A method for determining a minimum word size required to execute an instruction having at least one operand according to claim 19, wherein said tag comprises a multiple bit value.

21. A method for determining a minimum word size required to execute an instruction having at least one operand according to claim 19, further comprising enabling only a portion of a data path, said portion of said data path corresponding to said minimum number of subfields necessary to represent the operand as defined by said tag.

22. A method for determining a minimum word size required to execute an instruction having at least one operand according to claim 19, further comprising the step of assigning a second tag to said result obtained by performing said instruction, said second tag operative for identifying the minimum number of subfields of said result necessary to represent said result without loss of information.

23. A method for determining a minimum word size required to execute an instruction having at least one operand according to claim 19, wherein said second tag comprises a single bit.

24. A method for determining a minimum word size required to execute an instruction having at least one operand according to claim 19, wherein said tag comprises a multiple bit value.

* * * * *